(No Model.) 3 Sheets—Sheet 1.
A. G. WILKINS.
APPARATUS FOR ATTACHING BUTTONS.
No. 314,092. Patented Mar. 17, 1885.
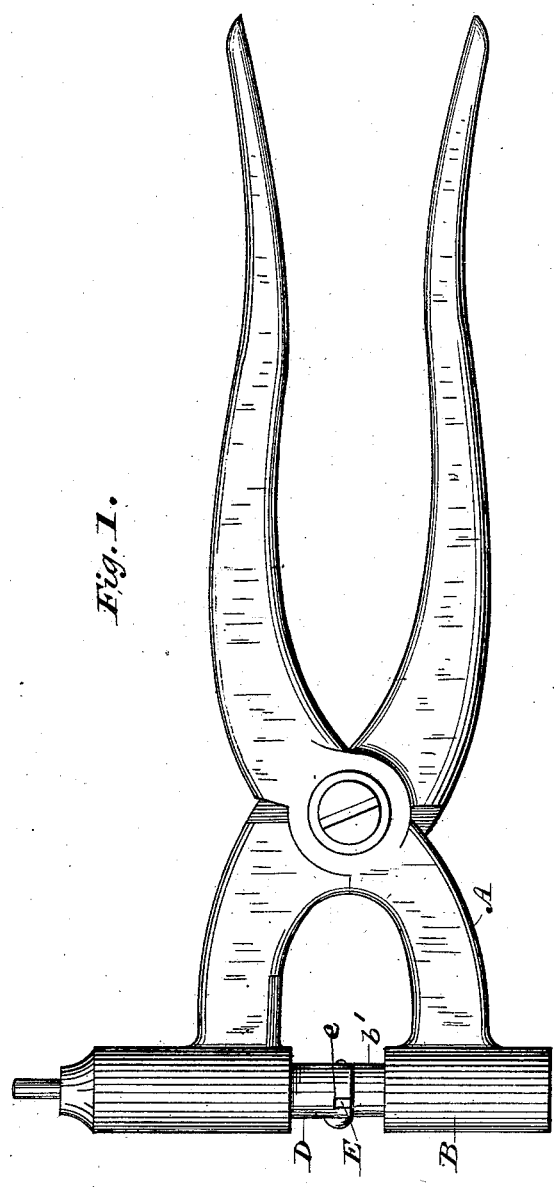
Witnesses:
T. C. Brecht
D. P. Cove
Inventor:
Alexander G. Wilkins,
By R. K. Evans,
Attorney.

(No Model.) 3 Sheets—Sheet 2.
A. G. WILKINS.
APPARATUS FOR ATTACHING BUTTONS.
No. 314,092. Patented Mar. 17, 1885.
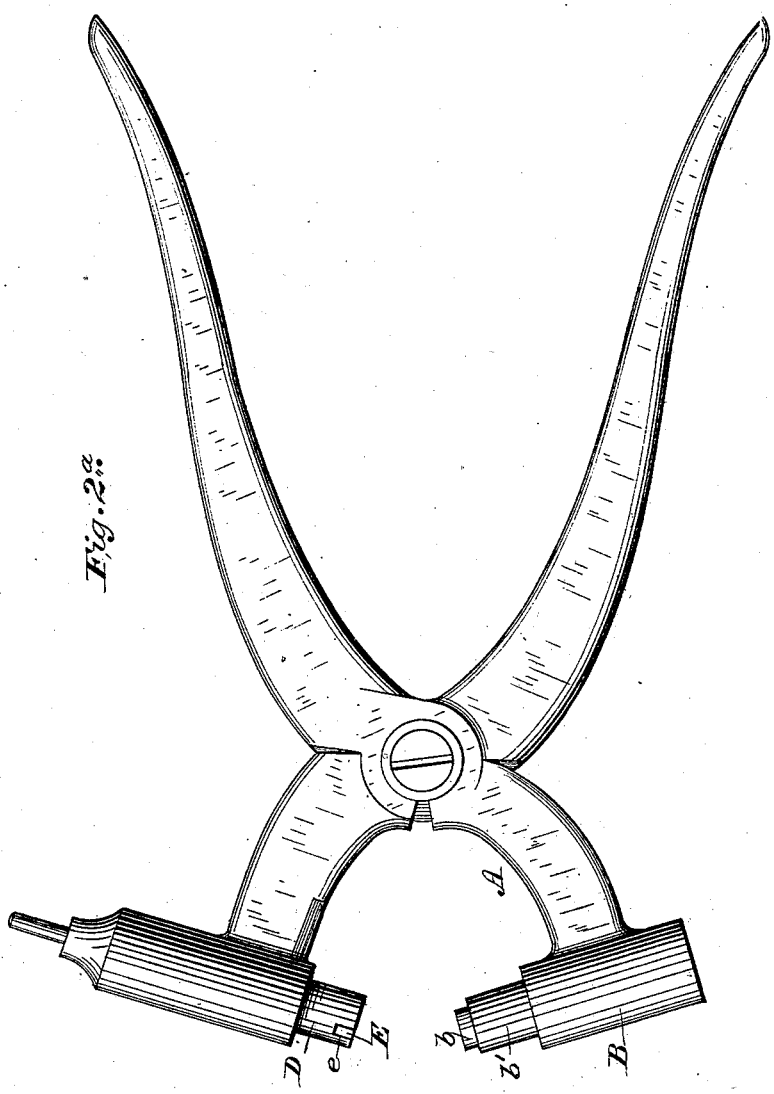
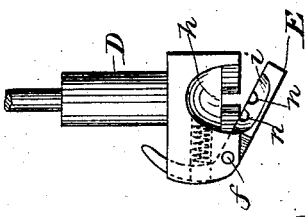
Witnesses:
T. C. Brecht
D. P. Cowl
Inventor:
Alex. G. Wilkins,
By R. K. Evans
Attorney.

(No Model.) 3 Sheets—Sheet 3.
A. G. WILKINS.
APPARATUS FOR ATTACHING BUTTONS.
No. 314,092. Patented Mar. 17, 1885.
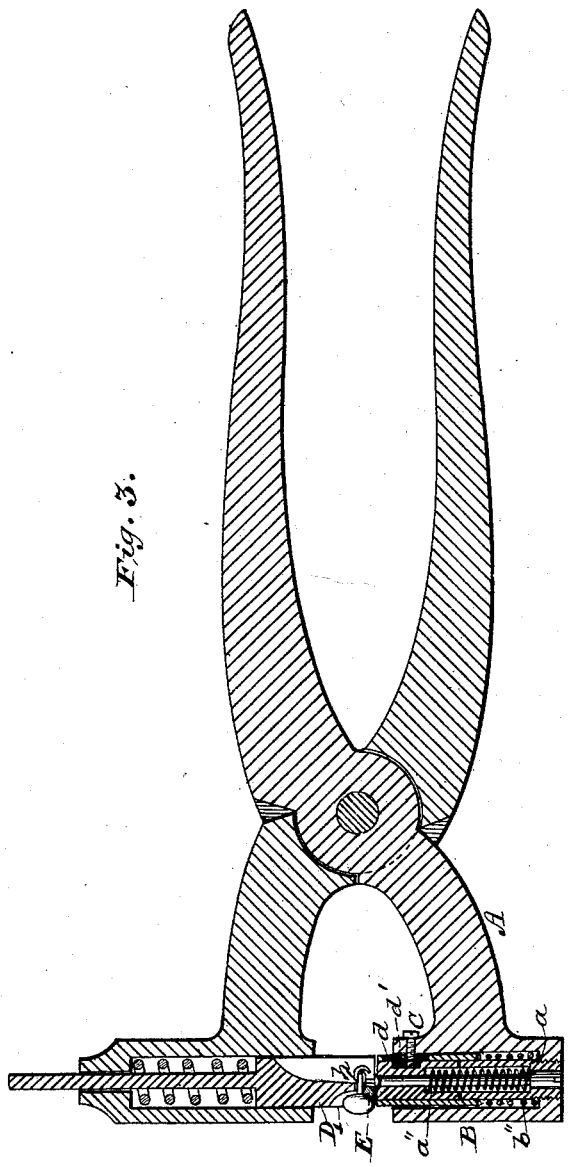
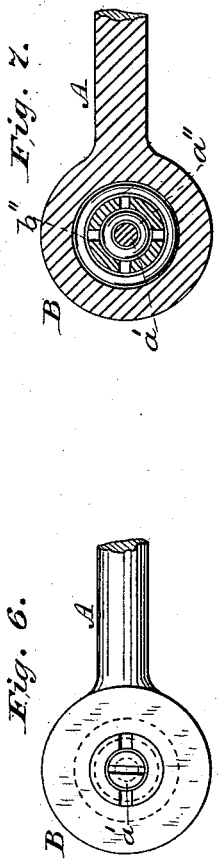
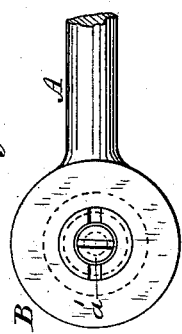
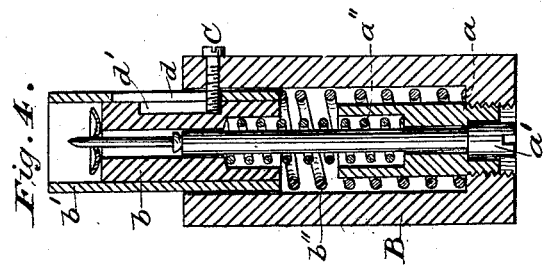
Witnesses:
T. C. Brecht
D. P. Cowe
Inventor:
Alex. G. Wilkins,
By R. K. Evans
Attorney

UNITED STATES PATENT OFFICE.

ALEXANDER G. WILKINS, OF MEADVILLE, PENNSYLVANIA, ASSIGNOR TO THE WILKINS SHOE BUTTON FASTENER COMPANY, OF SAME PLACE.

APPARATUS FOR ATTACHING BUTTONS.

SPECIFICATION forming part of Letters Patent No. 314,092, dated March 17, 1885.

Application filed April 14, 1884. Renewed February 3, 1885. (No model.)

*To all whom it may concern:*

Be it known that I, ALEXANDER G. WILKINS, of Meadville, in the county of Crawford and State of Pennsylvania, have invented certain Improvements in Apparatus for Attaching Buttons to Shoes and other Fabrics; and I hereby declare the following to be a full, clear, and exact description of the same, reference being had to the accompanying drawings, making part of this specification, in which—

Figure 1 is a side elevation with the parts in position at the moment of finishing the attachment of the button. Fig. 2 is a view of the button-holding head with the latch open to receive a button. Fig. 2ª is a side elevation with the fastening and holding devices separated. Fig. 3 is a vertical cross-sectional view with the button inserted. Fig. 4 is a vertical cross-section, enlarged, of the fastener-holding device. Figs. 5, 6, and 7 are details to be referred to.

My invention relates to apparatus for attaching buttons to shoes and other fabrics, and is an improvement upon Letters Patent issued to me bearing date of October 31, 1882, No. 266,940; and my invention consists, first, in the details of construction of a button-holding latch carried on the end of a spring upsetting-bolt; second, in a novel fastener-holder, as is hereinafter fully described, and specifically pointed out in the claims.

In order that those skilled in the art may make and use my invention, I will proceed to describe the manner in which I have carried it out.

In the said drawings, A is the lower jaw, provided on its end with a cylinder or barrel, B, preferably cast integral with the jaw. The bottom of the barrel is shouldered at $a$, the interior of said shoulder being tapped to receive the screw-thread of a central screw-bolt, $a'$, provided with a socket on the inner face of its head to receive a spiral spring, $a''$, which on its upper end enters and sustains a spring-bolt, $b$, surrounding the bolt $a'$, being centrally bored throughout its length to receive said bolt.

Surrounding spring-bolt $b$ is a sleeve, $b'$, the lower end of which rests on a coiled spring, $b''$, sustained below by the annular shoulder on the lower end of barrel B. The length of spring-bolt $b$ is less than that of sleeve $b'$, and in their normal condition their lower ends rest in the same plane. This brings the upper end of spring-bolt $b$ below the surface of the sleeve $b'$, and the distance below both to the upper end of screw-bolt or fixed bolt $a'$ is such that when a fastening-pin is inserted head downward into the central opening of spring-bolt $b$ its head rests upon the end of fixed bolt $a'$, and its point is to a minimum degree below the upper surface of sleeve $b'$, thereby protecting the point from being struck or moved when the material is being inserted, and providing a centering and guiding support almost up to its point. (See Fig. 4.) The washer rests within the sleeve $b'$, which protects it from displacement, and upon the upper end of spring-bolt $b$.

A screw, C, enters and passes through barrel B, through a slot, $d$, in the sleeve $b'$, and into a groove, $d'$, in the spring-bolt $b$, whereby the sleeve $b'$ and spring-bolt $b$ have free vertical play, but cannot be displaced from the barrel. The pin and washer being placed as seen in Fig. 4, and a button in the button-holder, the jaws are brought together, and as spring-bolt D forces the material down over the pin the spring-sleeve $b'$ and spring-bolt $b$ yield and telescope down into the barrel until the upper end of fixed bolt $a'$ comes snug against the surface of the goods and forms a solid anvil against which to upset the pin.

In the lower face of the spring upsetting-bolt D is cut a transverse slot, $e$. In this slot rests a button-holding latch, E, pivoted at $f$, and having its edge cut away at $i$, in order to accommodate the button, and provided with two curvilinear recesses, $n$ $n$, in which rests the wire of the button-eye when the button is inserted for fastening. Behind the latch E the head of the upsetting-bolt is cut away, as seen at $h$, to allow the button-eye to pass into a line with the movement of the upsetting-tool, as will be seen in Fig. 2. The face of the head of the bolt D is cut away at $t$ to facilitate the insertion of the button.

Having thus described my invention, what I claim as new, and desire to secure by Letters Patent, is—

1. In an apparatus for securing buttons, the jaw A, provided with the barrel B, and a concentric sleeve adapted to project above the point of the fastening-pin when in place and protect it from contact with the fabric, substantially as set forth.

2. In an apparatus for securing buttons, the jaw A, in combination with a centrally-arranged continuous cylindrical receptacle to receive the fastening-pin, and means, substantially as set forth, adapted to support it and center it throughout its length, for the purpose described.

3. In a button-securing apparatus, the jaw A and barrel B, in combination with central fixed bolt, $a'$, spring-bolt $b$, sleeve $b'$, and springs $a''$ $b''$, all constructed, arranged, and operated as set forth.

4. In an apparatus for securing buttons, the spring upsetting-bolt D, provided with the slot $e$, in combination with the spring button-holding latch E, provided with recesses $n$ $n$, to receive the wire of the button-eye, substantially as set forth.

5. In an apparatus for securing buttons, the spring-bolt D, having the transverse slot $e$, spring button-holding latch E, and recess $h$, all constructed and operated as set forth.

ALEXANDER G. WILKINS.

Witnesses:
J. N. McCloskey,
Jesse Hazen.